(12) United States Patent
Jager et al.

(10) Patent No.: US 6,850,706 B2
(45) Date of Patent: Feb. 1, 2005

(54) METHOD FOR MONITORING THE OPERATION OF OPTICAL SUPPLY LINE FIBERS

(75) Inventors: Hubert Jager, Pullach (DE); Detlef Stoll, Boca Raton, FL (US); Gerhard Stortz, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 390 days.

(21) Appl. No.: 09/839,350

(22) Filed: Apr. 20, 2001

(65) Prior Publication Data

US 2002/0012137 A1 Jan. 31, 2002

(30) Foreign Application Priority Data

Apr. 20, 2000 (DE) ......................................... 100 19 814

(51) Int. Cl.[7] ........................... H04B 10/08; H04B 10/00
(52) U.S. Cl. .............................. 398/31; 398/30; 398/32; 398/33; 398/168
(58) Field of Search ................................ 398/141, 168, 398/177, 5, 13, 16, 20, 30, 31, 32, 33, 34, 72, 113

(56) References Cited

U.S. PATENT DOCUMENTS

| | | | | |
|---|---|---|---|---|
| 5,825,515 A | * | 10/1998 | Anderson | 398/10 |
| 5,923,453 A | * | 7/1999 | Yoneyama | 398/34 |
| 5,943,146 A | * | 8/1999 | Harano | 398/31 |
| 5,995,254 A | * | 11/1999 | Koga et al. | 398/34 |
| 6,028,684 A | * | 2/2000 | Kidorf | 398/20 |
| 6,301,404 B1 | * | 10/2001 | Yoneyama | 385/24 |
| 6,331,906 B1 | * | 12/2001 | Sharma et al. | 398/48 |

FOREIGN PATENT DOCUMENTS

DE   199 09 565   10/2000

OTHER PUBLICATIONS

A Cost–Effective Approach to Introduce an Optical WDM Network in the Metropolitan Environment, Johansson et al, pp. 1109–1122.

* cited by examiner

Primary Examiner—Leslie Pascal
Assistant Examiner—Dalzid Singh
(74) Attorney, Agent, or Firm—Bell Boyd & Lloyd LLC

(57) ABSTRACT

An optical auxiliary signal, produced in a central device, is transmitted in addition to a user signal from the central to a remote optical device via at least two optical supply line fibers which are provided for transmitting optical signals between the central and remote optical devices. The optical auxiliary signal received in the remote optical device is diverted, is transmitted via a second optical supply line fiber to the central optical device, and the reception or the absence of the optical auxiliary signal and of the optical user signal in the central optical device are evaluated in order to monitor the operational state of the optical supply line fibers.

11 Claims, 4 Drawing Sheets

METHOD FOR MONITORING THE OPERATION OF OPTICAL SUPPLY LINE FIBERS

BACKGROUND OF THE INVENTION

1. Field of the Invention

The present invention relates to a method for monitoring the operation of optical supply line fibers within a transparent fiber-optic communications network, in particular according to patent DE 199 10 646.0, with at least two optical supply line fibers being provided for transmission of optical user signals between a central and a remote optical device.

2. Description of the Prior Art

In modern fiber-optic communications networks, in particular in communications networks using ring or double-star technology, the communications devices of a network customer of, for example, an Internet provider are connected to the fiber-optic communications network with the aid of a number of optical supply line fibers. Amounts of data in the Gigabit range are normally transmitted via such optical supply line fibers, with the data transmission taking place between a central device, for example a network node in the fiber-optic communications network, and a remote optical device, for example a network termination appliance. With such high data transmission rates, network customers demand that the network operator provide high reliability for the fully optical communications network and for the connection to the fiber-optic communications network.

In order to make it possible to ensure that the connection of the communications devices to the fiber-optic communications network is operating correctly, this connection must be monitored remotely. This means that information about the operational state of the optical supply line fibers for the respective network connection must be available in the respective network node. If, for example, a malfunction occurs for the connection of a network customer, then it is impossible for a network operator who is not remotely monitoring the connection of the network customer to assess whether the malfunction is located in his own responsibility area, for example because a digger has damaged one of the optical supply line fibers, or whether the fault is within the responsibility area of the network customer, for example his transmission laser is defective. It is, thus, advantageous to be able to monitor automatically and remotely whether defects and/or interruptions in optical supply line fibers are or are not in the responsibility area of the network operator.

Furthermore, in the case of fiber-optic communications networks which are being set up or extended, particularly in the case of metropolitan ring communications networks, the optical fibers or fiber pairs available for connecting the adjacent network nodes to one another are frequently not fully utilized between two adjacent network nodes, that is to say there is not yet any need for multiple use of the individual optical fibers by using wavelength division multiplexing (WDM) in an extension phase such as this or when the existing fiber capacities of the fiber-optic communications network are utilized at such a low level.

In conventional, known network architectures, it is possible to provide an unused optical fiber, which connects a number of network nodes to one another, exclusively for one network customer, via which the network customer can extract information from the fiber-optic communications network or can transmit to the fiber-optic communications network. Such optical fibers reserved specifically for one network customer are referred to in the specialist world by the term "dark fibers." Dark fibers describes the fact that the optical signal transmitted in the optical fiber in the fiber-optic communications network is produced exclusively by the laser unit of the network customer and the optical signal received in the network node is not converted in any way by the network operator nor is it passed on, for example, once again at a different wavelength.

However, network architectures such as this provide the capability to provide a dark fiber only as an additional option to primary data transmission using WDM technology. That is, normally, optical supply line fibers for one network customer are passed to a WDM multiplexer which is located at a network node and using which the optical signals received via a number of supply line fibers are multiplexed onto a common optical fiber connecting the individual network nodes. In this context see, in particular, "A Cost-Effective Approach to Introduce an Optical WDM Network in the Metropolitan Environment", S. Johannson, et al., IEEE Journal on Selected Areas in Communications, Vol. 16, No. 7, September 1998, page 1109 to page 1121. However, when a network customer is connected via such dark fibers it is impossible to monitor the transmission quality or to detect the transmitted amounts of data, as is required, for example, for the network operator to raise charges. No protective measures, for example alarming of the respective optical network node, have been provided either for the occurrence of a malfunction of the dark fibers in known communications networks, via which fault localization would be possible quickly and reliably. In addition, no protection circuits for dark fibers are known via which it would be possible to switch to the redundant optical dark fiber in the event of a fiber in the active optical dark fiber breaking. This lack of service facilities results in the network operator being able to connect only an extremely small number of network customers to the network via a dark fiber.

An object to which the present invention is directed is to improve the connection of network customers to the transparent optical fibers which connect the network nodes of the transparent fiber-optic communications network, in terms of both the monitoring of the optical supply line fibers and the reliability of the connection passed via the optical supply line fibers and, thus, to allow step-by-step extension of the fiber-optic communications network, initially without using WDM technology.

SUMMARY OF THE INVENTION

Accordingly, in an embodiment of the method of the present invention, an optical auxiliary signal which is produced in the central device is transmitted together with a first optical user signal via at least one of the optical supply line fibers from the central optical device to the remote optical device, and the optical auxiliary signal which is received in the remote optical device is diverted and transmitted back via at least one further fiber of the optical supply line fibers to the central optical device in addition to a second optical user signal. According to the present invention, the reception of the optical auxiliary signal which is being transmitted back is evaluated optically in the central optical device in order to monitor the operational state of at least one of the two optical supply line fibers. An additional optical auxiliary signal is advantageously produced here in a network controller arranged in the network node, or in a monitoring device, and is transmitted via the complete supply line fiber to the network termination appliance in addition to a first user signal, although the auxiliary signal does not need to satisfy any stringent quality requirements in this case and, thus, a low-cost laser diode, or possibly a light-emitting diode, can be used to produce it. The auxiliary signal is input and output in the central and remote optical devices, respectively, preferably by using optical couplers, so that there is no need for additional conversion of the optical auxiliary signal into an electrical signal. The diversion of the optical auxiliary signal in the remote device also can be provided by a single additional optical diversion fiber and, thus, does not involve any major technical complexity. In other words, the network termination appliance installed with the network customer has a simple, passive design, and is extremely reliable. The passive design results in no external electrical power supply being required locally with the network customer for the passive network termination appliance, thus further resulting in additional flexibility for selecting the location for operation of the passive network termination appliance. Reception of the optical auxiliary signal after diversion in the passive network termination appliance allows a serviceable operational state of the optical supply line fibers to be detected in an advantageous manner.

According to a further embodiment of the method according to the present invention, in addition to the optical auxiliary signal, the second optical user signal is evaluated in the central optical device in order to monitor the operational state of the two optical fibers. Additionally, at least a portion of the auxiliary signal which is received in the remote optical device is tapped off, and the fiber state information contained in the tapped-off auxiliary signal and the fiber state information contained in the second optical user signal, relating to the operational state of the two optical supply line fibers, is indicated in the remote optical device. In addition, the frequency of the optical auxiliary signal is in the optically visible frequency band and, when produced in the network node, has a light power intensity of less than 2 milliwatts. This is linked to the advantages that a portion of the auxiliary signal can be tapped off in the passive network termination appliance and can be indicated directly to the network customer on the passive network termination appliance without any danger to the eyesight of the maintenance personnel; that is, the network customer is provided in a particularly simple but efficient manner with information about the operational state of the supply line fibers from the network node to the passive network termination appliance, and can report any malfunction that occurs in the supply line fibers to the network operator, for example by telephone.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
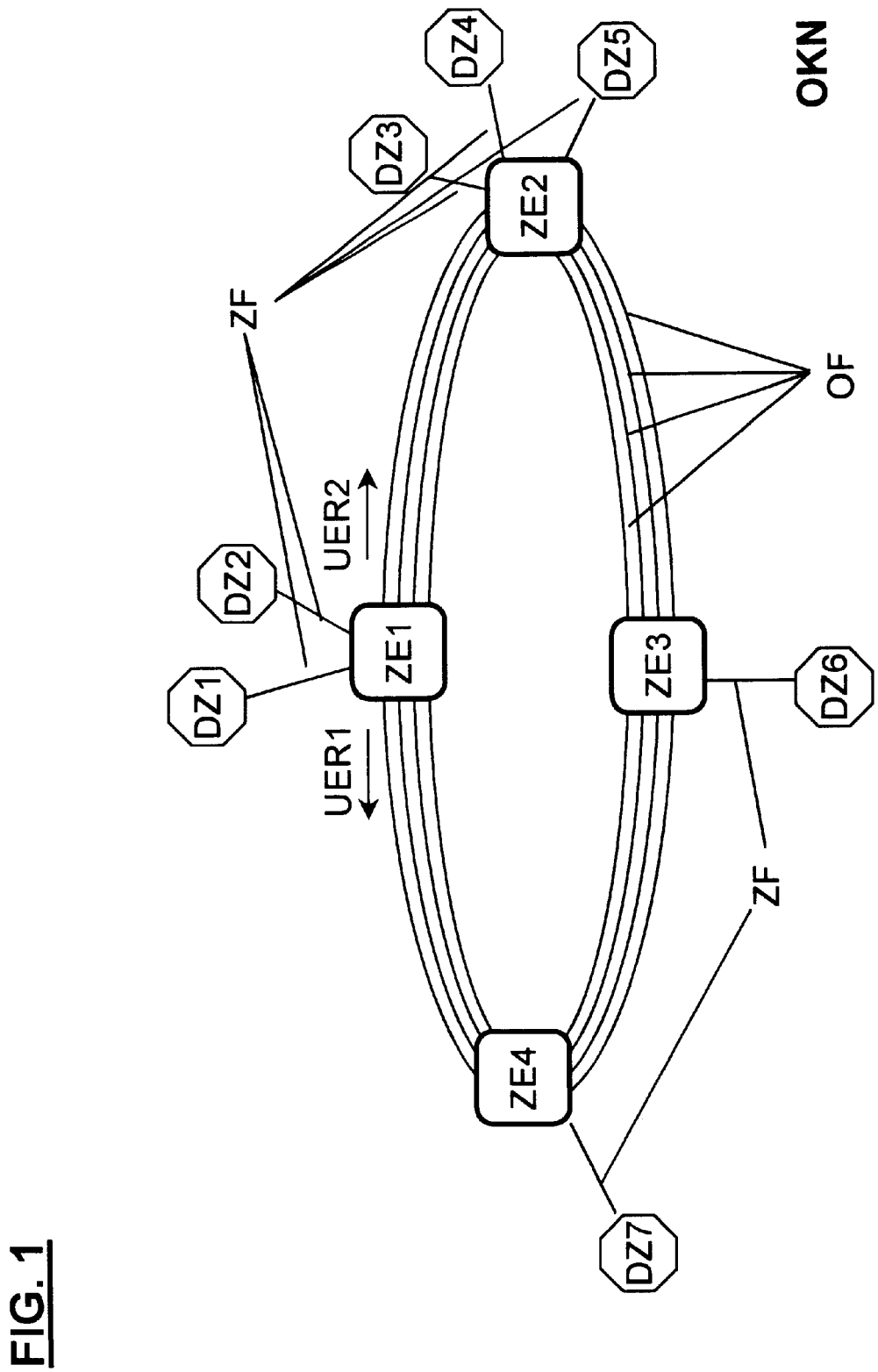
FIG. 1 is an outline circuit diagram showing a transparent fiber-optic communications network.

FIG. 1 shows, schematically, a transparent fiber-optic communications network OKN, for example a communications network OKN having a ring network topology, with, by way of example, a first, second, third and fourth optical network node ZE1–ZE4 being illustrated for a large number of possible central optical devices or optical network nodes ZE. The individual optical network nodes are each connected to one another at the respective adjacent nodes via optical fibers OF, that is to say the first optical network node ZE1 is connected to the second ZE2, the second ZE2 is connected to the third ZE3, the third ZE3 is connected to the fourth ZE4, and the fourth ZE4 is connected to the first ZE1, in each case via optical fibers OF, thus resulting in a transparent fiber-optic communications network OKN having a ring network topology. By way of example, FIG. 1 illustrates four of a large number of optical fibers OF. Furthermore, the optical fibers OF are operated in a unidirectional operating mode, in which it is possible to transmit optical signals os via the optical fibers OF both in a first transmission direction UE1 and in a second transmission direction UE2, this being the opposite direction to the first, that is to say each optical fiber OF has a first or second associated transmission direction UER1/2, on an application-oriented basis.

In addition and by way of example, FIG. 1 illustrates a first, second, third, fourth, fifth, sixth and seventh remote optical device DZ1–DZ7 for a large number of possible remote optical devices or optical passive network termination appliances of a network customer DZ, with the first and second remote devices DZ1, DZ2 being connected to the first optical network node ZE1, the third, fourth and fifth remote optical devices DZ3, DZ4, DZ5 being connected to the second optical network node ZE2, the sixth remote optical device DZ6 being connected to the third optical network node ZE3, and the seventh remote optical device DZ7 being connected to the fourth optical network node ZE4, in each case via optical supply line fibers ZF.

Figure 2:
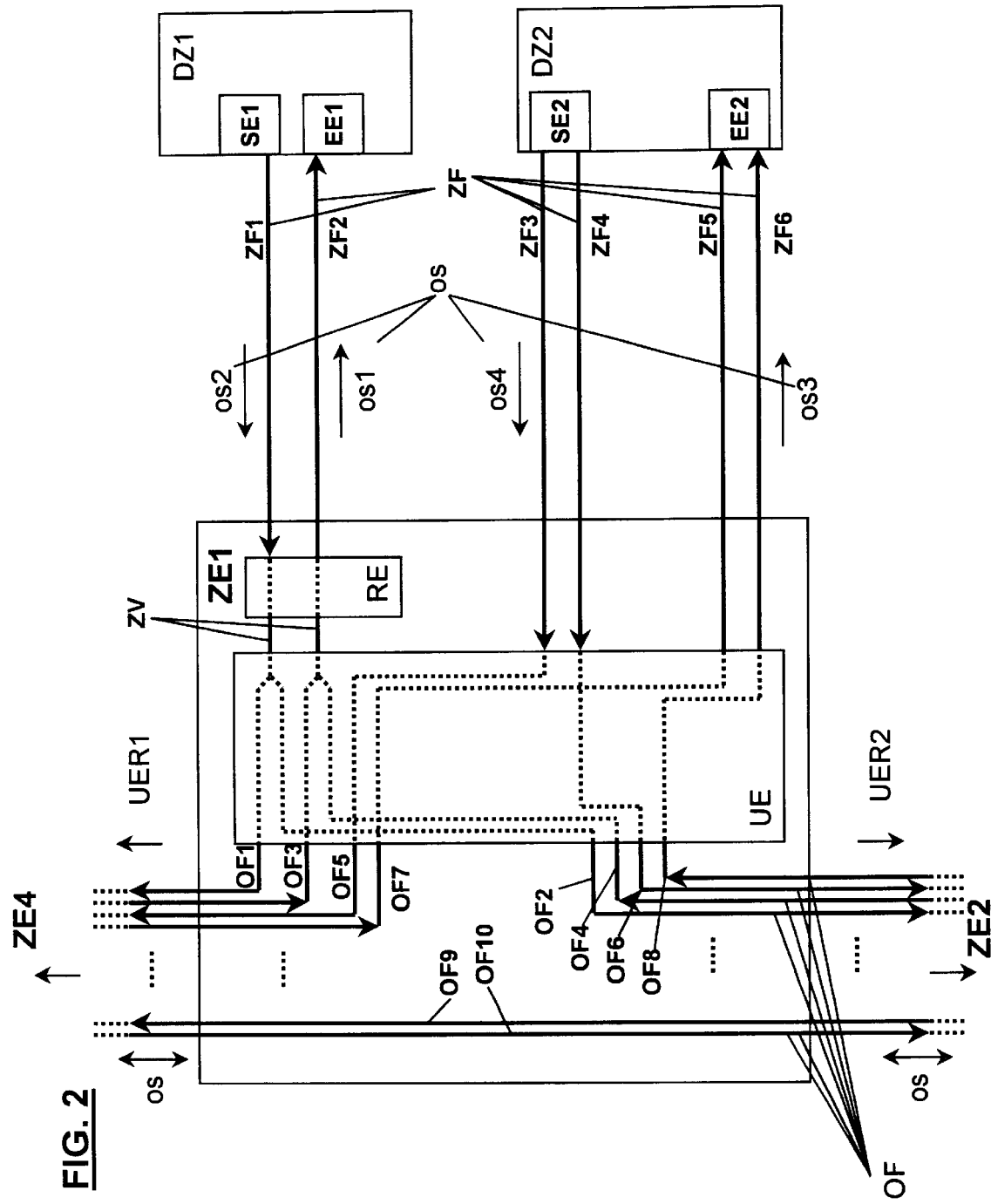
FIG. 2 is a further outline circuit diagram showing an example of the connection of two communications devices of a network customer to an optical network node in the transparent fiber-optic communications network.

FIG. 2 illustrates the first optical network node ZE1 and the first and second remote optical devices DZ1, DZ2 which are connected to it via optical supply line fibers ZF, with a first optical receiving unit EE1 for receiving optical signals os, and a first optical transmitting device SE1 for transmitting optical signals os, being provided in the first optical remote device DZ1. Analogously to this, a second optical receiving unit EE2 for receiving optical signals os, and a second optical transmitting device SE2 for transmitting optical signals os, are provided in the second remote optical device DZ2.

According to the present invention, the first optical network node ZE1 has a monitoring unit UE for monitoring the operational state of the optical supply line fibers ZF1–ZF6 and/or of the optical fibers OF connected to the optical monitoring device UE, and for monitoring the data rate of the data being transmitted at that time between the first and second remote and the first central optical devices DZ1, DZ2, ZE1. Furthermore, the first optical network node ZE1 has a regeneration unit RE for reproducing the original transmission level of the optical signals os transmitted via the optical connecting fibers ZV and/or via the optical fibers OF, with the regeneration unit RE being connected, by way of example, in FIG. 2 via optical supply line fibers ZF to the monitoring device UE, and the first optical supply line fiber ZF1 and the second optical supply line fiber ZF2 being connected to the regeneration device RE. In addition, the regeneration device RE can be used, for example, to regenerate the transmitted signal pulses ("pulse shaping") and/or to recover the signal clock ("retiming").

In a further refinement of the transparent fiber-optic communications network OKN, which is not illustrated in FIG. 2, the optical fibers OF are, by way of example, connected directly to the regeneration unit RE, and the regeneration device RE is, in turn, connected via optical connecting fibers ZV to the monitoring device UE. By way of example, FIG. 2 shows a first, second, third, fourth, fifth, sixth, seventh, eighth, ninth and tenth of a large number of optical fibers OF1–OF10, which are connected to the first optical network node ZE1. In this case, by way of example, the ninth and tenth optical fibers OF9, OF10 are routed via the first optical network node ZE1, that is to say no remote optical device DZ is connected to the ninth and tenth optical fibers OF9, OF10 in the first optical network node ZE1. The first, third, fifth and seventh optical fibers OF1, OF3, OF5, OF7 connect the fourth network node ZE4 to the first network node ZE1 and, in the first network node ZE1 for example, they are connected directly to the monitoring device UE. Analogously to this, the first optical network node ZE1 is connected via the second, fourth, sixth and eighth optical fibers OF2, OF4, OF6, OF8 to the second optical network node, which are in turn connected, in the first optical network node ZE1 for example, directly to the monitoring device UE.

Furthermore, FIG. 2 indicates the first optical transmission direction UER1, which is intended for transmitting the optical signals os in the direction from the first to the fourth optical network nodes ZE1, ZE4, and the second optical transmission direction UER2, which is intended for transmitting the optical signals os in the direction from the first to the second optical network nodes ZE1, ZE2, with the first, fourth, fifth, eighth and ninth optical fibers, OF1, OF4, OF5, OF9 being operated, by way of example, unidirectionally in the first transmission direction UER1, and the second, third, sixth, seventh and tenth optical fibers OF2, OF3, OF6, OF7, OF10 being operated, by way of example, unidirectionally in the second transmission direction UER2.

The first remote optical device DZ1 is connected to the first network node ZE1 via the first and second optical supply line fibers ZF1, ZF2, with optical signals OS being transmitted via the first optical supply line fiber ZF1 from the transmission unit ZE1 in the first remote optical device DZ1 to the regeneration device RE in the first network node ZE1, and optical signals os being transmitted via the second optical supply line fiber ZF2 from the regeneration device RE in the first optical network node ZE1 to the first receiving unit EE1 in the first remote optical device DZ1.

In contrast to this, the second remote optical device DZ2 is connected via a third, fourth, fifth and sixth optical supply line fiber ZF3, ZF4, ZF5, ZF6 to the first optical network node ZE1 and to the monitoring device UE in the first optical network node ZE1, that is to say 1+1 line protection is also provided for the connection of the second remote optical device DZ2 to the first optical network node ZE1. For this purpose, the same optical signals os are transmitted via the third and fourth optical supply line fibers ZF3, ZF4 virtually simultaneously from the second transmission unit SE2 in the second remote optical device DZ2 to the monitoring device UE in the first optical network node ZE1, and the same optical signals os are transmitted approximately simultaneously via the fifth and sixth optical supply line fibers ZF5, ZF6 from the monitoring device UE in the first optical network node ZE1 to the receiving unit EE2 in the second remote optical device DZ2; that is, the fourth and fifth optical supply line fibers ZF4, ZF5 are operated in a redundant operating mode.

A first optical signal os1 which is transmitted via the third optical fiber OF3 in the second transmission direction UER2 to the first optical network node ZE1 is routed in the first optical network node ZE1 to the monitoring device UE, where it is monitored for the first optical signal os1 transmitted redundantly via the fourth optical fiber OF4 in the first transmission direction UER1 to the first optical network node ZE1; that is, the first optical signal os1 received is used to check the operational state of the third and fourth optical fibers OF3, OF4. The first optical signal os1 is then passed via the one optical supply line fiber ZF1 to the regeneration unit RE. The regeneration unit RE is used to regenerate the original optical signal level for the received first optical signal os1, which is then transmitted via the second optical supply line fiber ZF2 to the first receiving unit EE1 in the first remote optical device DZ1. The first optical signal os1 received in the first receiving unit EE1 in the first remote optical device DZ1 is then processed further in the first remote optical device DZ1.

The second optical signal os2, produced, for example, by the first optical transmission unit SE1, is transmitted from the first remote optical device DZ1 via the first optical supply line fiber ZF1 to the regeneration unit RE in the first optical network node ZE1. After regeneration of the second optical signal os2, it is transmitted via a further optical supply line fiber ZF to the monitoring device UE. In the monitoring device UE, the second optical signal os2 is preprocessed for transmission via the first and the second optical fibers OF1, OF2 and the operational state of the first optical supply line fiber ZF1 is monitored. Furthermore, the data rate associated with the first remote optical device DZ1 is monitored in the monitoring device UE. The second optical signal os2 is transmitted actively via the first optical fiber OF1 in the first transmission direction UER1 and redundantly via the second optical fiber OF2 in the second transmission direction UER2 from the monitoring device UE in the first optical network node ZE1 to the fourth and second optical network nodes ZE4, ZE2, respectively.

In addition, FIG. 2 shows a further refinement of the transparent fiber-optic communications network OKN resulting from the addition of the connection of the second remote device DZ2 to the first optical network node ZE1 via a 1+1 line protection circuit. A third optical signal os3, which is transmitted via the seventh and eighth optical fibers OF7, OF8 to the first optical network node ZE1 approximately simultaneously, is passed to the monitoring device UE in the first optical network node ZE1. The monitoring device UE checks the operational state of the seventh and eighth optical fibers OF7, OF8 and monitors the data rate used for transmission to the second remote device DZ2. In contrast to the connection (described above) of the first remote device DZ1 to the first optical network node ZE1, the third optical signal os3, which is transmitted via the seventh optical fiber OF7, is passed in the monitoring device to the fifth optical supply line fiber ZF5, and is transmitted via this to the second remote optical device DZ2. Analogously to this, the third optical signal os3, which is transmitted via the eighth optical fiber OF8, is passed via the monitoring device UE to the sixth optical supply line fiber ZF6, and is transmitted via this to the second remote optical device DZ2. Both the third optical signal os3 transmitted via the fifth optical supply line fiber and the third optical signal os3 transmitted via the sixth optical supply line fiber are received in the second optical receiving unit EE2 in the second remote optical device DZ2, and are further processed in the second remote optical device DZ2.

The fourth optical signal os4, which is produced by the second transmission device SE2, for example in the second remote optical device DZ2, is transmitted approximately simultaneously via both the third and fourth optical supply line fibers ZF3, ZF4 to the first optical network node ZE1, and is passed to the monitoring device UE in the first optical network node ZE1. The monitoring device UE monitors the operational state of the third and fourth optical supply line fibers ZF3, ZF4 and the data rate of the data being transmitted at that time between the second remote device DZ2 and the optical network node ZE2. The fourth optical signal os4, which is transmitted via the third optical supply line fiber ZF3 to the monitoring device UE, is then transmitted actively via the fifth optical fiber OF5 from the monitoring device UE in the first optical network node ZE1 to the fourth optical network node ZE4 in the first transmission direction UER1. Analogously to this, the fourth optical signal os4, which is transmitted redundantly via the fourth optical supply line fiber ZF4 to the monitoring device, is transmitted redundantly via the sixth optical fiber OF6 from the monitoring device in the first optical network node ZE1 to the second optical network node ZE2, in the second transmission direction UER2.

Figure 3:
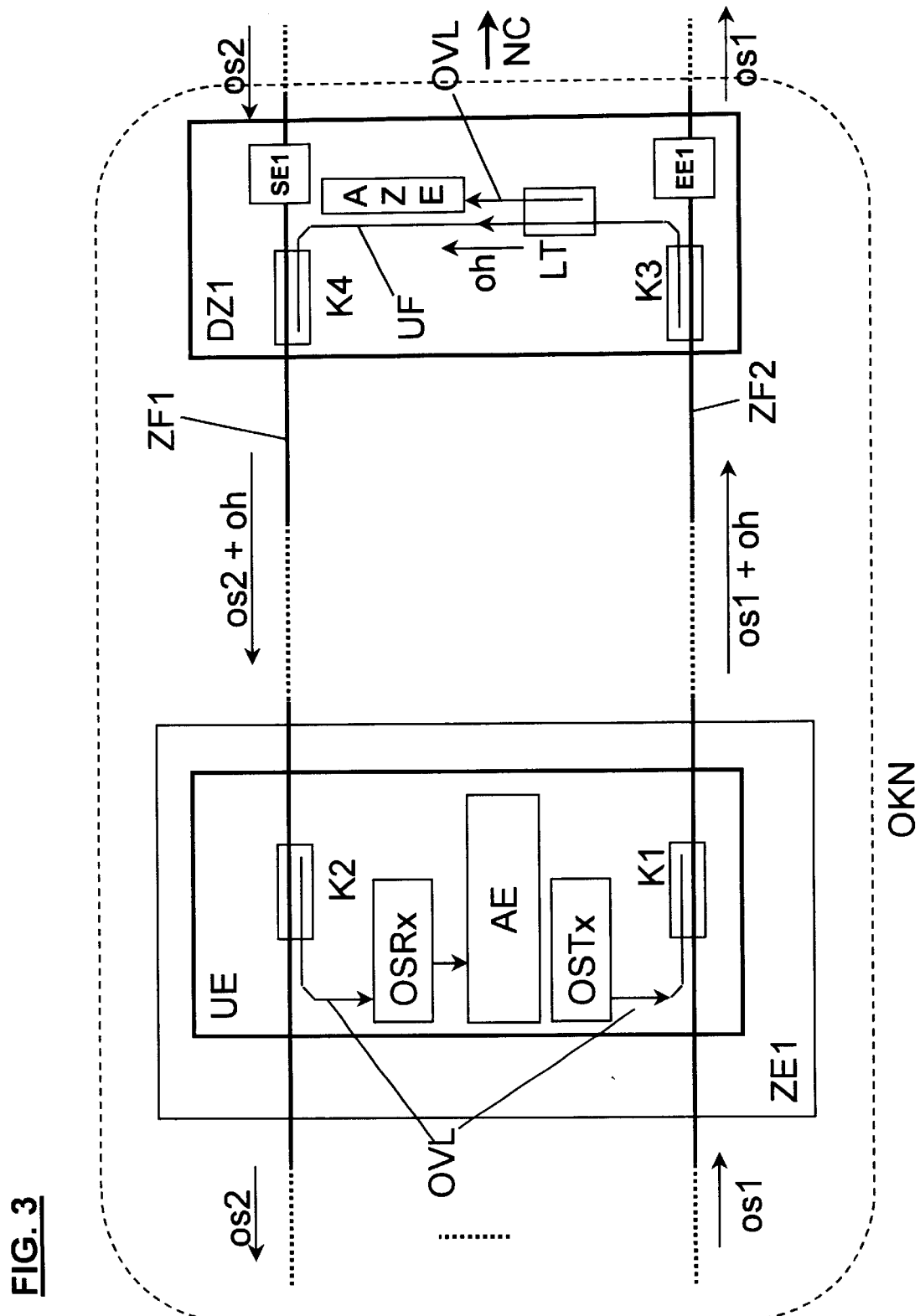
FIG. 3 is a further outline circuit diagram showing a pair of optical supply line fibers between an optical network node and the network termination appliance according to the present invention in a transparent fiber-optic communications network.

FIG. 3 shows details of the transparent fiber-optic communications network OKN from FIG. 2 illustrating, in particular, the first central optical device ZE1, for example an optical network node, and the first remote optical device DZ1, for example a passive network termination appliance. In this case, the distance between the first network node ZE1 and the first passive network termination appliance DZ1, which is considerably greater in reality, is indicated by a dotted line in FIG. 3.

Furthermore and analogously to FIG. 2, a monitoring device UE is arranged in the first network node ZE1, and has a first optical transmission unit OSTx for producing an optical auxiliary signal oh, and a first optical receiving unit OSRx for receiving the optical auxiliary signal oh transmitted back. The optical receiving unit OSRx is connected to an evaluation unit AE for optical evaluation of the received optical auxiliary signal oh, that is to say the evaluation unit AE makes it possible to indicate, for example visually, the received optical auxiliary signal oh. In addition, a first and a second selective-wavelength coupler K1, K2 are provided respectively in the first network node ZE1 and in the monitoring device UE for respectively inputting and outputting the optical auxiliary signal oh, with the first selective-wavelength coupler K1 being connected to the second optical supply line fiber ZF2 and, via an optical connecting fiber OVL, to the first optical transmission unit OSTx, and the second selective-wavelength coupler K2 being connected to the first optical supply line fiber ZF1 and, via a further optical connecting fiber OVL, to the first optical receiving device OSRx.

The passive network termination appliance DZ1 likewise has a third and a fourth selective-wavelength coupler K3, K4, which are connected, for example, via an optical diversion fiber UF. The third selective-wavelength coupler K3 is connected to the second optical supply line fiber ZF2, and the fourth selective-wavelength coupler K4 is connected to the first optical supply line fiber ZF1. Furthermore, a power splitter LT is provided, which is connected to the visual display unit AZE via an optical connecting fiber OVL, and to which the optical diversion fiber UF is connected.

A first optical user signal os1, which is transmitted by the transparent fiber-optic communications network OKN, for example, via a third optical fiber OF3 to the first optical network node ZE1, is passed in the first optical network node ZE1 via the second optical supply line fiber ZF2 to the first selective-wavelength coupler K1. The selective-wavelength coupler K1 is then used to couple the optical auxiliary signal oh and the first optical user signal os1 together to form a first optical transmission signal os1+oh, which is transmitted via the second optical supply line fiber ZF2 to the first passive network termination appliance DZ1. The first optical transmission signal os1+oh received in the first passive network termination appliance DZ1 via the second optical supply line fiber ZF2 is decoupled via the third selective-wavelength coupler K3, and the recovered optical auxiliary signal oh is transmitted via the optical diversion fiber UF to the fourth selective-wavelength coupler K4. The first optical user signal os1, on the other hand, is transmitted onward via the second optical supply line fiber ZF2 to the network customer NC. Furthermore, a portion of the signal power can be tapped off, via the power splitter LT, from the optical auxiliary signal oh passed via the optical diversion fiber UF, and then can be displayed to the network customer NC via the visual display unit AZE on the passive network termination appliance DZ1. This makes it possible for the network customer NC to visually monitor the operational state of the second optical supply line fiber ZF2 on the passive network termination appliance DZ1, that is to say, if the display unit AZE indicates reception of the optical auxiliary signal oh, then the second optical supply line fiber ZF2 is not broken and has no malfunction.

The second optical user signal os2 transmitted from the network customer NC to the first network termination appliance DZ1 is passed, in the first network termination appliance DZ1, via the first optical supply line fiber ZF1 to the fourth selective-wavelength coupler K4. In the fourth selective-wavelength coupler K4, the diverted optical auxiliary signal oh transmitted via the optical diversion fiber UF is coupled to the second optical user signal os2 to form a joint second optical transmission signal os2+oh, which is transmitted via the first optical supply line fiber ZF1 from the first network termination appliance DZ1 to the first optical network node ZE1. The second selective-wavelength coupler K2 is used to filter the optical auxiliary signal oh out of the second optical transmission signal os2+oh, and to pass it via an optical connecting fiber OVL to the first optical receiving unit OSRx. The information which is obtained by the first optical receiving unit OSRx from the optical auxiliary signal oh and which relates to the operational state of the first and second optical supply line fibers ZF1, ZF2 is indicated to the evaluation unit AE; e.g., reception of the optical auxiliary signal oh in the optical receiving unit OSRx can identify that the first and second optical supply line fibers ZF1, ZF2 are in a serviceable operational state. The second optical user signal os2 which remains after the filtering by the second selective-wavelength coupler K2 is transmitted, for example, via the second optical fiber OF2 to a further network node ZE in the transparent fiber-optic communications network OKN of the network operator.

Figure 4:
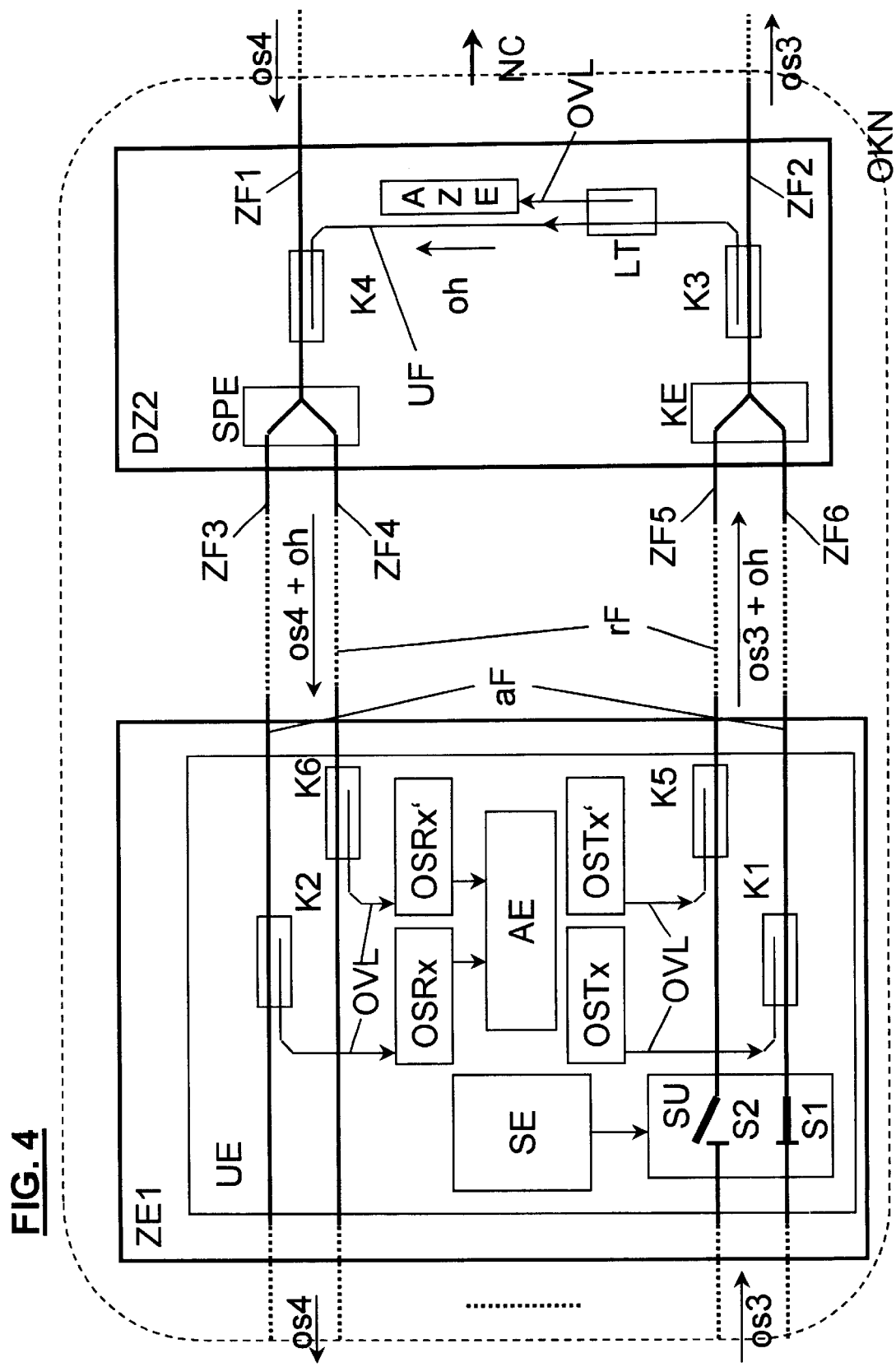
FIG. 4 is a further outline circuit diagram showing a pair of optical supply line fibers with 1+1 line protection between an optical network node and the network termination appliance according to the present invention in a transparent fiber-optic communications network.

Analogously to FIG. 3, FIG. 4 shows, schematically, a further detail of the transparent fiber-optic communications network OKN illustrated in FIG. 2, with a 1+1 line protection circuit being connected to the transparent fiber-optic communications network OKN and to the first optical network node ZE1 in order to improve the reliability of the second remote device DZ2. Not only is the fourth optical supply line fiber ZF4 provided in addition to the third optical supply line fiber ZF3, but the sixth optical supply line fiber ZF6 is also provided in addition to the fifth optical supply line fiber ZF5, for connection of a network customer NC for transmission of a third and fourth optical transmission signal, os3+oh, os4+oh, respectively. Thus, in the event of a failure or if a malfunction occurs on one of the active optical fibers aF, that is to say on the third or sixth optical supply line fibers ZF3, ZF6, the respectively associated redundant optical fibers rF, the fourth or fifth optical supply line fibers ZF4, ZF5, are used for the further data transmission.

In comparison to the arrangement (described in FIG. 3) in the monitoring device UE in the first network node ZE1, a second optical transmission device OSTx' and a second optical receiving device OSRx' are also provided for this purpose, with the second optical receiving device OSRx' likewise being connected to the evaluation unit AE. Furthermore, the first optical network node ZE1 is equipped with a fifth and a sixth selective-wavelength coupler K5, K6 for respectively inputting and outputting the optical auxiliary signal oh into the fifth and out of the fourth optical supply line fibers ZF5, ZF4, respectively, with the second optical transmission unit OSTx' being connected to the fifth selective-wavelength coupler K5, and the second optical receiving unit OSRx' being connected to the sixth selective-wavelength coupler K6, via a respective optical connecting fiber OVL. FIG. 4 shows, by way of example, a first and a second optical transmission device OSTx, OSTx', in which case, also as a further implementation in order to produce the optical auxiliary signal oh and to distribute the optical auxiliary signal oh between the active and redundant optical fibers aF, rF, the use of the first optical transmission device OSTx and of an additional power splitter. Using this, the optical auxiliary signal oh which is produced is distributed between the active and redundant fibers aF, rF, represents a further implementation, which is not illustrated in FIG. 4.

A control unit SE and a switching unit SU, which has a first and a second optical switch S1, S2, are also provided in the monitoring device UE in the first optical network node ZE1 in order to provide the 1+1 line protection, with the switching unit SU being controlled using the control unit SE. The first and second optical switches S1, S2 are provided for connection and disconnection of one of the redundant or active optical fibers aF, rF, and are controlled by the control unit SE via the switching unit SU. The control unit SU is controlled via a network management system, which is not illustrated in FIG. 4.

Furthermore, the first optical transmission signal os3+oh, which is transmitted via the fifth and/or sixth optical supply line fibers ZF5, ZF6, is joined to a combination unit KE, which is also provided in the first passive network termination appliance DZ1 and is connected to the third selective-wavelength coupler K3 via the second optical supply line fiber ZF2. In addition, an optical splitter unit SPE is provided in the first network termination appliance DZ1, using which the second optical user signal os2, which is transmitted via the first optical supply line fiber ZF1 from the network customer NC to the first network termination appliance DZ1, and the diverted auxiliary signal oh, which is coupled to the second optical user signal os2 via the fourth selective-wavelength coupler K4, are distributed approximately uniformly, for example, between the third and fourth optical supply line fibers ZF3, ZF4. The fourth optical transmission signal os4+h is thus transmitted approximately simultaneously, for example, via the third and fourth optical supply line fibers ZF3, ZF4, that is to say the fourth optical transmission signal os4+oh, which is transmitted via the fourth optical supply line fiber ZF4, the redundant optical fibers rF, is received in the first optical network node ZE1 despite any malfunction, caused by a line break, for example, in the third optical supply line fiber ZF3.

The third optical user signal os3, which is transmitted by the transparent fiber-optic communications network OKN to the network customer NC, is already transmitted redundantly via an active and a redundant optical fiber aF, rF to the first optical network node ZE1. In the first optical network node ZE1, the process of inputting the third optical user signal os3 into the fifth optical supply line fiber ZF5, one of the redundant fibers rF, is interrupted, for example, via the second optical switch S2 provided in the switching unit SU. That is, the third optical user signal os3 is transmitted exclusively via the sixth optical supply line fiber ZF6 from the first optical network node ZE1 to the first passive network termination appliance DZ1. If a malfunction now occurs during operation of the sixth optical supply line fiber ZF6, then the second optical switch S2 (which is shown open in FIG. 4) is closed and the first optical switch S1 is opened; i.e., from now on, the third optical user signal os3 is transmitted from the first optical network node ZE1 to the first passive network termination appliance DZ1 via the fifth optical supply line fiber ZF5. Alternatively, both the fifth and the sixth optical supply line fibers ZF5, ZF6 can be used simultaneously, for example, for data transmission with the aid of the switching unit SU, and the respectively faulty optical supply line fibers ZF5, ZF6 can be switched off if a malfunction occurs. Furthermore, analogously to the exemplary embodiment illustrated in FIG. 3, the optical auxiliary signal oh, which is produced by the first and second optical transmission devices OSTx, OSTx', is coupled in the first optical network node ZE1 with the third optical user signal os3, with the aid of the first and fifth selective-wavelength couplers K1, K5, respectively, to form a third optical transmission signal os3+oh, which is transmitted via the fifth and sixth optical supply line fibers ZF5, ZF6, respectively, to the first passive network termination appliance DZ1.

The third optical transmission signal os3+oh received in the first network termination appliance DZ1 is passed with the aid of the combination unit KE to the second optical supply line fiber ZF2, which is the only one still in existence from now on, with, by analogy to the FIG. 3 description, the optical auxiliary signal oh being separated from the third optical transmission signal os3+oh with the aid of the third selective-wavelength coupler K3, and being passed via the optical diversion fiber UF to the fourth selective-wavelength coupler K4. A portion of the diverted optical auxiliary signal oh is tapped off with the aid of the power splitter LT and is indicated to the network customer NC with the aid of the display unit AZE on the first network termination appliance DZ1, that is to say reception of the optical auxiliary signal oh is displayed visually to the network customer NC. Furthermore, the diverted optical auxiliary signal oh and the fourth optical user signal os4, which is transmitted by the network customer NC to the first network termination appliance DZ1 via the first optical supply line fiber ZF1, are coupled together by the fourth optical selective-wavelength coupler K4 to form a second optical signal os4+oh, which is, in turn, passed via the first optical supply line fiber ZF1 to the optical splitter unit SPE. There, the fourth optical transmission signal os4+oh is distributed, for example approximately uniformly, between the third and fourth optical supply line fibers ZF3, ZF4, and is then transmitted to the first optical network node ZE1.

In the first optical network node ZE1, the returned optical auxiliary signal oh is filtered out of the fourth optical transmission signal os4+oh, which is transmitted via both the active and the redundant fibers aF, rF, with the aid of the second and sixth selective-wavelength couplers K2, K6, respectively, and is then transmitted via the respective optical connecting line OVL to the first and second optical receiving units OSRx, OSRx', respectively. The information obtained by the first and second optical receiving units OSRx, OSRx' from the optical auxiliary signal oh and relating to the operational state of the third, fourth, fifth and sixth optical supply line fibers ZF3 to ZF6 is indicated to the evaluation unit AE, that is to say the serviceable operational state of the third, fourth, fifth and sixth optical supply line fibers ZF3 to ZF6 is confirmed, for example, by the respective reception of the optical auxiliary signal in the first and second optical receiving units OSRx, OSRx'. The fourth optical user signal os4 which remains after the filtering processes is transmitted via the fifth and the sixth optical fibers OF5, OF6 redundantly from the first network node ZE1 to the further network nodes ZE in the transparent fiber-optic communications network OKN.

In contrast to the diversion of the optical auxiliary signal oh in the first and second remote devices and in the first and second passive network termination appliances DZ1, DZ2 with the aid of an optical diversion fiber UF, as illustrated by way of example in FIG. 3 and FIG. 4, two separate optical diversion fibers UF, for both the active and redundant optical fibers aF, rF, can be provided in the network termination appliance DOE for the implementation of the method according to the invention with 1+1 line protection.

In order to monitor, for example, the entire connecting path between two remote devices DZ1, DZ2 which are connected to the same network nodes and to the same central device ZE1 in the transparent fiber-optic communications network OKN, the optical auxiliary signal oh, as described in the above exemplary embodiments, is transmitted to the first remote device DZ1 while, according to the present invention, it is diverted and is transmitted back to the first network node ZE1. Furthermore, the optical auxiliary signal oh, instead of being evaluated in the first network node ZE1, is passed to the further optical supply line fibers ZF which connect the first network node ZE1 to the second remote device DZ2 and is transmitted to the second remote device DZ2 where, it is diverted and is transmitted back to the first network node ZE1. The optical auxiliary signal oh, which is thus passed over the entire connecting path for a switched optical connection between the network customers NC connected to the first and second remote devices DZ1, DZ2, is optically evaluated, as described above, in the first network node ZE1 in order to monitor the operational state of the optical supply line fibers ZF forming the entire connecting path.

Furthermore, the monitoring device UE can, in each case, be connected via a defined interface to a network management system, not shown in FIGS. 1 to 4, using which the transparent fiber-optic communications network OKN can be remotely monitored by the network operator.

Although the present invention has been described with reference to specific embodiments, those of skill in the art will recognize that changes may be made thereto without departing from the spirit and scope of the invention as set forth in the hereafter appended claims.

We claim as our invention:

1. A method for monitoring operation of optical supply line fibers within a transparent fiber-optic communications network, the method comprising the steps of:

providing that the transparent fiber-optic communication network have a plurality of central optical devices connected to one another via further optical fibers;

providing a monitoring device for monitoring a data rate of data being transmitted between each central optical device and a remote optical device;

providing a regeneration unit for reproducing an original transmission level of optical signals transmitted via the optical fibers and the optical supply line fibers within each of the central optical devices;

providing at least two optical supply line fibers for transmission of a plurality of optical user signals between one of the a central optical devices and the remote optical device;

transmitting an optical auxiliary signal, which is produced in the monitoring device of the respective central optical device, together with a first optical user signal via at least one of the optical supply line fibers from the respective central optical device to the remote optical device;

diverting and transmitting back, via at least one further fiber of the optical supply line fibers, the optical auxiliary signal received in the remote optical device to the monitoring device of the respective central optical device in addition to a second optical user signal; and evaluating the optical auxiliary signal in the monitoring device of the respective central optical device in order to monitor an operational state of at least one of the at least two optical supply line fibers.

2. A method for monitoring operation of optical supply line fibers within a transparent fiber-optic communications network as claimed in claim 1, the method further comprising the step of:

evaluating, in addition to the optical auxiliary signal, the second optical user signal in the central optical device in order to monitor operational states of the at least two optical supply line fibers.

3. A method for monitoring operation of optical supply line fibers within a transparent fiber-optic communications network as claimed in claim 1, the method further comprising the steps of:

tapping off at least a portion of the optical auxiliary signal received in the remote optical device; and indicating in the remote optical device fiber state information contained in the tapped-off auxiliary signal and fiber state information contained in the second optical user signal relating to the operational states of the at least two optical supply line fibers.

4. A method for monitoring operation of optical supply line fibers within a transparent fiber-optic communications network as claimed in claim 1, wherein frequency of the optical auxiliary signal is in an optically visible frequency band.

5. A method for monitoring operation of optical supply line fibers within a transparent fiber-optic communications network as claimed in claim 1, wherein the optical auxiliary signal produced in the central optical device has a light power intensity of less than 2 milliwatts.

6. A method for monitoring operation of optical supply line fibers within a transparent fiber-optic communications network as claimed in claim 1, the method further comprising the steps of:

using a first selective-wavelength fiber coupler to assist in the step of transmitting; and using a second selective-wavelength fiber coupler to assist in the step of diverting and transmitting back.

7. A method for monitoring operation of optical supply line fibers within a transparent fiber-optic communications network as claimed in claim 1, wherein the central optical device is a network node, and the remote optical device is a passive network termination appliance of the transparent fiber-optic communications network.

8. A method for monitoring operation of optical supply line fibers within a transparent fiber-optic communications network as claimed in claim 1, wherein, during operation of at least two active optical supply line fibers and redundant optical supply line fibers, at least one optical auxiliary signal produced in the central optical device is transmitted from the central optical device to the remote optical device via at least one of the at least two active optical supply line fibers and the redundant optical supply line fibers, such that the at least one optical auxiliary signal received in the remote optical device is diverted and transmitted back via at least one further of the at least two active optical supply line fibers and the redundant optical supply line fibers to the central optical device.

9. A method for monitoring operation of optical supply line fibers within a transparent fiber-optic communications network as claimed in claim 8, wherein at least one optical switch is provided in the central optical device via which one of the at least two active optical supply line fibers and the redundant optical supply line fibers is switched to be inactive, and wherein at least one optical coupler and at least one optical power splitter are provided in the remote optical device such that the optical coupler combines the optical auxiliary signal and the respective optical user signal transmitted from the central optical device to the remote optical device via the at least one of the at least two active optical supply line fibers and the redundant optical supply line fibers to form another optical signal, and the optical power splitter splits a further respective optical user signal, transmitted via the further optical fiber between at least one further of the at least two active optical supply line fibers and the redundant supply line fibers, and the further respective optical user signal is transmitted to the central optical device.

10. A method for monitoring operation of optical supply line fibers within a transparent fiber-optic communications network as claimed in claim 1, the method further comprising the step of:

providing at least one optical diversion fiber, in the remote optical device, for diversion of the optical auxiliary signal carried out in the remote optical device.

11. A method for monitoring operation of optical supply line fibers within a transparent fiber-optic communications network as claimed in claim 1, wherein, in order to monitor operational states of the at least two optical supply line fibers which connect the first and a second remote optical device via the central optical device, the optical auxiliary signal transmitted back from the first remote optical device is transmitted via the central optical device together with the second optical user signal via at least one of the optical supply line fibers from the central optical device to the second remote optical device, such that the optical auxiliary signal received in the second remote optical device is diverted and transmitted back via at least one further of the optical supply line fibers to the central optical device in addition to the first optical user signal, and such that the reception of the optical auxiliary signal, which has been transmitted back, in the central optical device is evaluated optically in order to monitor the operational states of the two optical supply line fibers.

* * * * *